(12) United States Patent
Phatak et al.

(10) Patent No.: US 8,346,966 B1
(45) Date of Patent: Jan. 1, 2013

(54) TRANSPARENT FILE SYSTEM ACCESS FOR WIDE AREA NETWORK FILE SYSTEM ACCELERATION

(75) Inventors: Shirish H. Phatak, Somerset, NJ (US); Chandra Kilaru Satish, Edison, NJ (US); Murali Rangarajan, South Plainfield, NJ (US); Pratik Shankarial Rana, Piscataway, NJ (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 365 days.

(21) Appl. No.: 11/780,123

(22) Filed: Jul. 19, 2007

(51) Int. Cl.
G06F 15/16 (2006.01)
G06F 12/00 (2006.01)

(52) U.S. Cl. .............. 709/245; 711/3; 711/200
(58) Field of Classification Search .................. 709/245
See application file for complete search history.

(56) References Cited

U.S. PATENT DOCUMENTS

| | | | |
|---|---|---|---|
| 5,452,447 A | 9/1995 | Nelson et al. | |
| 5,594,863 A | 1/1997 | Stiles | |
| 5,611,049 A | 3/1997 | Pitts | |
| 5,634,122 A | 5/1997 | Loucks et al. | |
| 5,689,706 A | 11/1997 | Rao et al. | |
| 5,706,435 A | 1/1998 | Barbara et al. | |
| 5,717,897 A | 2/1998 | McCrory | |
| 5,740,370 A | 4/1998 | Battersby et al. | |
| 5,805,809 A | 9/1998 | Singh et al. | |
| 5,864,837 A | 1/1999 | Maimone | |
| 5,878,218 A | 3/1999 | Maddalozzo et al. | |
| 5,881,229 A | 3/1999 | Singh et al. | |
| 6,012,085 A | 1/2000 | Yohe et al. | |
| 6,049,874 A | 4/2000 | McClain et al. | |
| 6,119,151 A * | 9/2000 | Cantrell et al. ............. | 709/216 |
| 6,122,629 A | 9/2000 | Walker et al. | |
| 6,243,760 B1 | 6/2001 | Armbruster et al. | |
| 6,366,952 B2 | 4/2002 | Pitts | |
| 6,397,307 B2 | 5/2002 | Ohran | |
| 6,453,404 B1 | 9/2002 | Bereznyi et al. | |
| 6,505,241 B2 | 1/2003 | Pitts | |
| 6,587,921 B2 | 7/2003 | Chiu et al. | |
| 6,597,956 B1 | 7/2003 | Aziz et al. | |
| 6,609,183 B2 | 8/2003 | Ohran | |
| 6,751,608 B1 * | 6/2004 | Cohen et al. ............. | 1/1 |
| 6,944,676 B1 | 9/2005 | Armbruster et al. | |
| 2001/0011300 A1 | 8/2001 | Pitts | |
| 2001/0016896 A1 | 8/2001 | Pitts | |
| 2001/0047482 A1 | 11/2001 | Harris et al. | |
| 2001/0052058 A1 | 12/2001 | Ohran | |
| 2002/0083111 A1 | 6/2002 | Row et al. | |
| 2002/0144068 A1 | 10/2002 | Ohran | |
| 2004/0049579 A1 * | 3/2004 | Ims et al. .................. | 709/225 |

(Continued)

OTHER PUBLICATIONS

Carey, M.J., M.J. Franklin, M. Livny and E.J. Shekita, "Data Caching Tradeoffs in Client-Server DBMS Architectures", Proceedings of the 1991 ACM SIGMOD International Conference on Management of Data, Feb. 1991, pp. 357-366.

(Continued)

*Primary Examiner* — David Lazaro
*Assistant Examiner* — Xiang Yu
(74) *Attorney, Agent, or Firm* — Baker Botts L.L.P.

(57) ABSTRACT

The present invention, in particular embodiments, provides methods, apparatuses and systems directed to providing a mechanism by which clients can transparently access remote file server appliances. Due to this, clients do not need to modify the pathnames in order to access the file servers.

16 Claims, 8 Drawing Sheets

U.S. PATENT DOCUMENTS

2004/0255048 A1* 12/2004 Lev Ran et al. ............... 709/249
2004/0260768 A1   12/2004 Mizuno
2006/0080352 A1*  4/2006 Boubez et al. ................ 707/102
2007/0088669 A1*  4/2007 Jaschek et al. .................... 707/1
2008/0212495 A1*  9/2008 Stirbu ........................... 370/254
2009/0094252 A1*  4/2009 Wong et al. ..................... 707/10

OTHER PUBLICATIONS

Cox, A.L. and R.J. Fowler, "Adaptive Cache Coherency for Detecting Migratory Shared Data". Proceedings of the 20$^{th}$ Annual International Symposium on Computer Architecture, 1993, pp. 98-108.

Cortes, T., S. Girona and J. Labarta, "Avoiding the Cache Coherence Problem in a Parallel/Distributed File System," Proceedings of the High-Performance Computing and Networking Confernce, Apr. 1997, pp. 860-869.

Cortes, T., S. Girona and J. Labarta, "Design Issues of a Cooperative Cache with no Coherence Problems," Proceedings of the 5$^{th}$ Workshop on I/O in Parallel and Distributed Systems, Nov. 17, 1997, pp. 37-46.

Wang, J. "A Survey of Web Caching Schemes for the Internet", ACM SIGCOMM Computer Communcation Review, vol. 29, No. 5, Oct. 1999, pp. 36-46.

Wu, K-L and P.S. Yu, "Local Replication for Proxy Web Caches with Hash Routing," Proceedings of the CIKM '99, Nov. 1999, pp. 69-76.

Luo, Q., et al., "Middle-Tier Database Caching for e-Business," Proceedings of the 2002 ACM SIGMOD Conference, Jun. 4-6, 2002, pp. 600-611.

Gray, C.G. and D.R. Cheriton, "Leases: An Efficient Fault-Tolerant Mechanism for Distributed File Cache Consistency", Proceedings of the 12$^{th}$ ACM Symposium on Operating Systems Principles, pp. 202-210, Nov. 1989.

Satyanarayanan, M., et al., "Coda File System User and System Administrators Manual", Carnegie Mellon University, Aug. 1997.

Braam, P.J. and P.A. Nelson, "Removing Bottlenecks in Distributed Filesystems: Coda and InterMezzo as Examples", Proceedings of the Linux Expo 1999, May 1999.

Braam, P.J., M. Callahan and P. Schwan, "The InterMezzo File System", Proceedings of the Perl Conference 3, O'Reilly Open Source Convention, Aug. 1999.

Phatak, S.H., and B.R. Badrinath, "Data Partitioning for Disconnected Client Server Databases", Proceedings of the 1$^{st}$ ACM International Workshop on Data Engineering and Wireless Mobile Access, pp. 102-109, 1999.

Tierney, B.L., et al., "A Network-Aware Distributed Storage Cache for Data Intensive Environments", Proceedings of the 8$^{th}$ IEEE International Symposium on High Performance Distributed Computing, pp. 185-193, 1999.

Braam, P.J., "InterMezzo: File Synchronization with InterSync", Carnegie Mellon University, Mar. 20, 2002.

Tacit Networks, Inc. ("Tacit Networks Delivers LAN-Speed Access to Data over WANs") press release, Dec. 9, 2002.

Satyanarayanan, M., "Coda: A Highly Available File System for a Distributed Workstation Environment (#13)", Proceedings of the Second IEEE Workshop on Workstation Operating Systems, Pacific Grove, CA, Sep. 1989.

Braam, P.J. "The Coda Distributed File System (#74)", Linux Journal, No. 50, Jun. 1998.

* cited by examiner

TRANSPARENT FILE SYSTEM ACCESS FOR WIDE AREA NETWORK FILE SYSTEM ACCELERATION

TECHNICAL FIELD

The present disclosure relates to file sharing and file access over networks.

BACKGROUND

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data. In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations connected across WANs, while also providing interoperability with standard file sharing protocols such as NFS and CIFS.

WAFS systems typically consist of edge file gateway (EFG) appliances (or servers), which are placed at multiple remote offices, and one or more file server appliances, at a central office or remote data center relative to the EFG appliance, that allow storage resources to be accessed by the EFG appliances. Each EFG appliance appears as a local fileserver to office users at the respective remote offices. Together, the EFG appliances and file server appliance implement a distributed file system and communicate using a WAN-optimized protocol. This protocol is translated back and forth to NFS and CIFS at either end, to communicate with the user applications and the remote storage.

The WAN-optimized protocol typically may include file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files and the ability to serve cached data to users while minimizing the overhead of expensive kernel-user communication and context switches, in effect enabling the cache to act just like a high-performance the server. Typically, the cache attempts to mirror the remote data center, so that "read" requests will be satisfied from the local cache with only a few WAN round trips required to check credentials and availability of file updates.

In WAFS systems, "write" operations should maintain data coherency, i.e., file updates ("writes") from any one office should not to conflict with updates from another office. To achieve data coherency, some WAFS systems use file leases. Leases define particular access privileges to a file from a remote office. If a user at an office wants to write to a cached file, the EFG appliance at that office obtains a "write lease", i.e., a right to modify the document before it can do so. The WAFS system ensures that at any time there will be only one EFG appliance that has the write lease on a particular file. Also, when a user at another office tries to open the file, the EFG appliance that has the write lease flushes its data first and optionally can give up the write lease if there are no active writers to the file.

WAFS systems may also operate in connection with distributed file system ("DFS") technology. DFS is a network file system whose clients, servers, and storage devices are dispersed among the machines of a distributed system or intranet. Service activity typically occurs across the network, and instead of a single centralized data repository, the system has multiple and independent storage devices. In some DFSs, servers run on dedicated machines while in others a machine can be both a server and a client. A DFS can be implemented as part of a distributed operating system, or else by a software layer whose task is to manage the communication between conventional operating systems and file systems. One aspect of a DFS is that the system has many and autonomous clients and servers. DFS can be used to provide location transparency and redundancy to improve data availability in the face of failure or heavy load by allowing shares in multiple different locations to be logically grouped under one folder, or DFS root. When users try to access a share that exists off the DFS root, the user is really looking at a DFS link and the DFS server transparently redirects them to the correct file server and share.

SUMMARY

The present invention, in particular embodiments, provides methods, apparatuses and systems directed to providing a mechanism by which clients can transparently access remote file server appliances. In particular implementations, the present invention takes advantage of Distributed File System (DFS) client functionality to provide for transparent remote file system access over wide area network systems.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Aspects of the claimed embodiments are directed to redirection of clients to transparently access locally cached versions of remote shared resources at a local gateway of a wide area network accelerated file system. Specifically, the present invention, in particular embodiments, provides methods, apparatuses and systems directed to providing a mechanism by which clients can transparently access remote resources over a network where a wide area file system is deployed to optimize the session between the client and the file server. In a particular implementation, a gateway appliance intermediates a remote file connection session between a client and a file server. The gateway modifies one or more handshake messages during initiation of the connection to cause the client to request referral links for access to shared resources. As part of a CIFS session, for example, the client asks for a DFS referral on a share of interest. The remote file server then responds by sending a referral to the client. The gateway intercepts the response and modifies it to identify a referral target to a locally cached version of the shared resource. Upon receiving this referral, the client connects to the gateway directly.

Before a full description of the claimed embodiments is presented, various environments will first be described in which those claimed embodiments may operate.

A. Network Environment

Figure 1A:
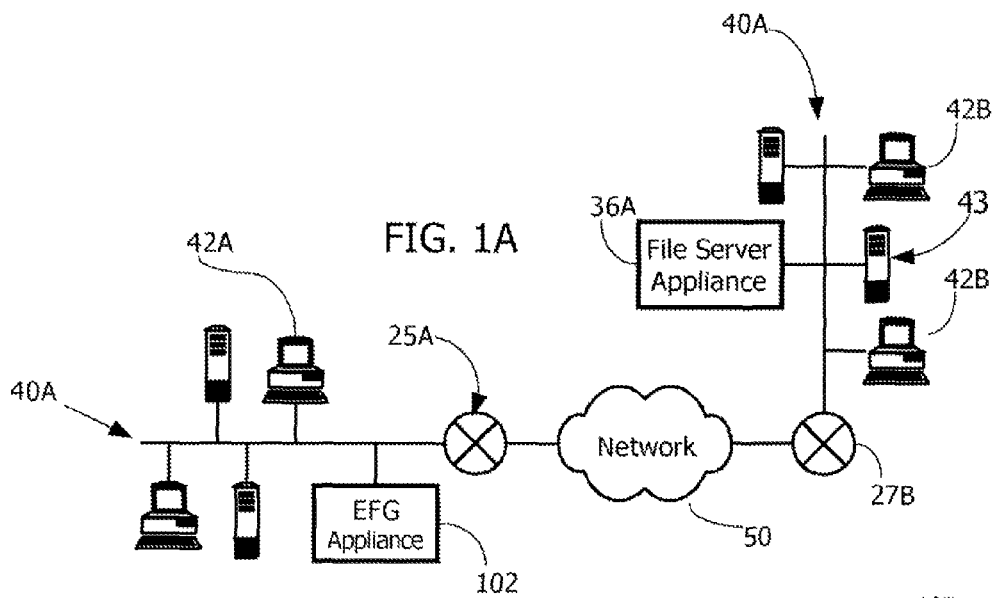
FIGS. 1A-1 are high-level block diagrams illustrating example computer network environments in which embodiments of the present invention might operate.
Figure 1B:
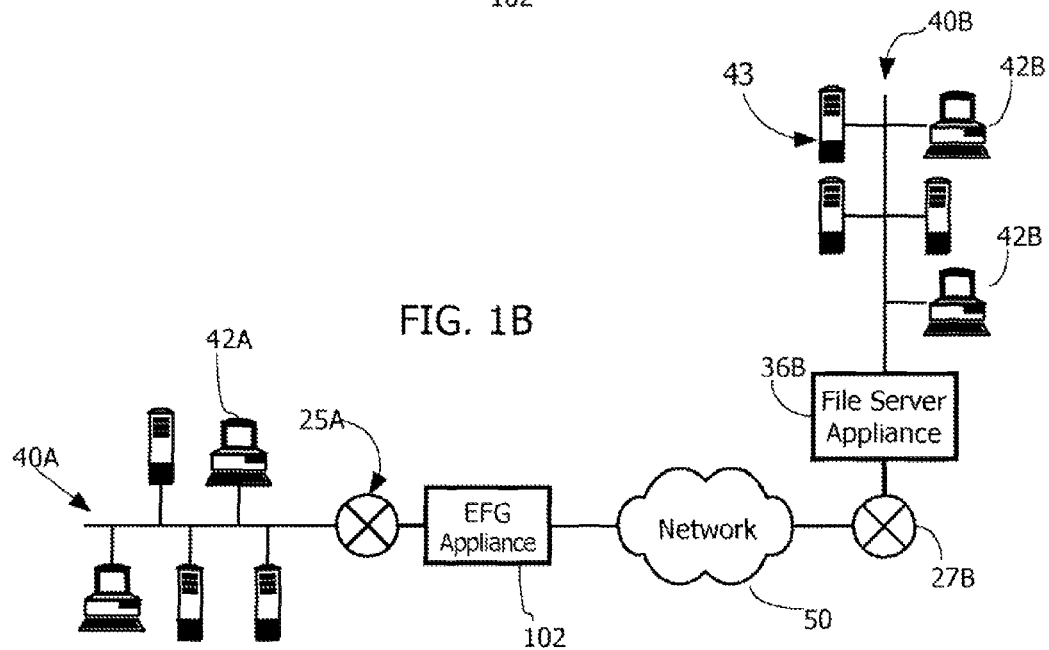

As discussed in the background above, WAFS systems often include one or more EFG appliances 102 (or servers) and one or more remote file server appliances 36 (or servers), typically at a different location, that allow storage resources to be accessed by the EEG appliances 102 on behalf of workstations 42A. FIGS. 1A-1 show at a high level such an arrangement, which might be used with an embodiment of the present invention. In particular, FIGS. 1A-1B show a network 50 connecting a remote the server appliance 36 to EFG appliance 102. In turn, the remote file server appliance 36 is connected, via a LAN (40A, 40B) or other network, to a file server 43 and the EFG appliances 102 are connected, again via a LAN 40A or other network, to workstations 42A. It can be appreciated that EFG appliances 102 may also be remote file server appliances with respect to data stored on resources operably connected to the same LAN or subnet.

In the embodiment of FIG. 1A, a router 25A is interposed between the LAN 40A and the network 50 which is in turn connected to router 27B and LAN 40B. In the embodiment of FIG. 1B, EFG appliance 102 is interposed between router 27B and the network 50. In a similar fashion, router 27B is deployed between the network 50 and the file server appliance 36B.

Figure 2:
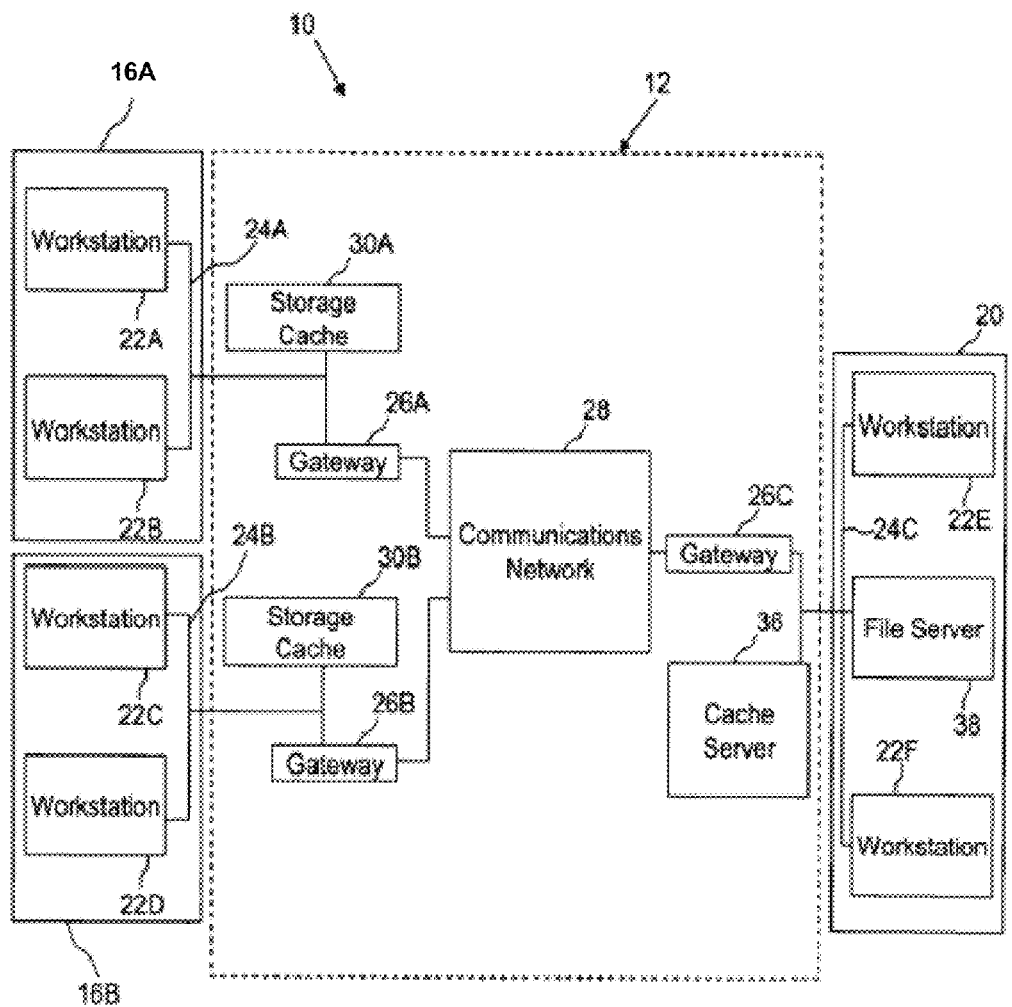
FIG. 2 is a lower-level block diagram illustrating an example computer network environment in which embodiments of the present invention might operate.

FIG. 2 is a block diagram showing, at a lower level, an example computer network environment in which embodiments of the present invention might operate. The network environment 10 includes a storage-caching protocol system 12 that interfaces with a distributed file system application operating at a data center computer system, which is a repository for data files, and a computer system which is associated with a computer workstation that desires to access, i.e., view only (read) or modify (write), data files stored at a file server of a data center system. The data center system is typically at a remote location relative to the computer system. The storage-caching protocol system 12 includes at least one EFG appliance 30A, 30B (here referred to as a "storage cache"), which is coupled to a workstation of an associated remote system, and at least one remote file server appliance 36 (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

Storage caching protocol system 12 in the illustrative network 10 shown in FIG. 2, the system 12 interfaces with work group computer systems 16A and 16B and a central work group data center computer system 20. The system 16A includes computer workstations 22A and 22B interconnected over a communications channel 24A, such as an Ethernet or like medium. Similarly, the system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a system, in combination with the Ethernet, form a LAN and operate in accordance with a conventional distributed file system, such as NES or CIFS, which provides that a user of a workstation can access data files located remotely from the system in which the workstation is contained.

A communications gateway 26 couples the Ethernet 24 of each of the systems 16 to a communications network 28. The network 28, for example, can be a WAN, LAN, the Internet or any like means for providing data communications links between geographically disparate locations. The gateway 26, for example, may implement a VPN Internet connection with remote gateways and support DSL speeds. The gateway 26 enables data, such as data files accessible in accordance with a distributed file system such as NFS or CIFS, to be transferred between a workstation and a remotely located file server. Furthermore, the functions of gateway 26 may be physically hosted on the same computing device as the storage cache and cache servers.

Referring again to FIG. 2, the storage caching system 12 includes storage caches (EFG appliances) 30A and 30B which are associated with the systems 16A and 16B, respectively. Each storage cache 30 is coupled to the Ethernet 24 and the gateway 26A, 26B of the associated system 16A, 16B. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22E and 22F contained in the data center system 20. The file server 38 is a file storage device, such as a NAS (Network Attached Storage), which is a repository for data files and provides for distribution of stored data files to authorized workstations in accordance with the operation of distributed file systems, such as NFS or CIFS, which are implemented at the authorized workstations of the systems 16 and the data center 20. For purposes of illustration, it is assumed that all of the workstations 22 in the systems 16 and in the data center 20 constitute authorized workstations and operate in accordance with a distributed file system compatible with that of the server 38.

Figure 3:
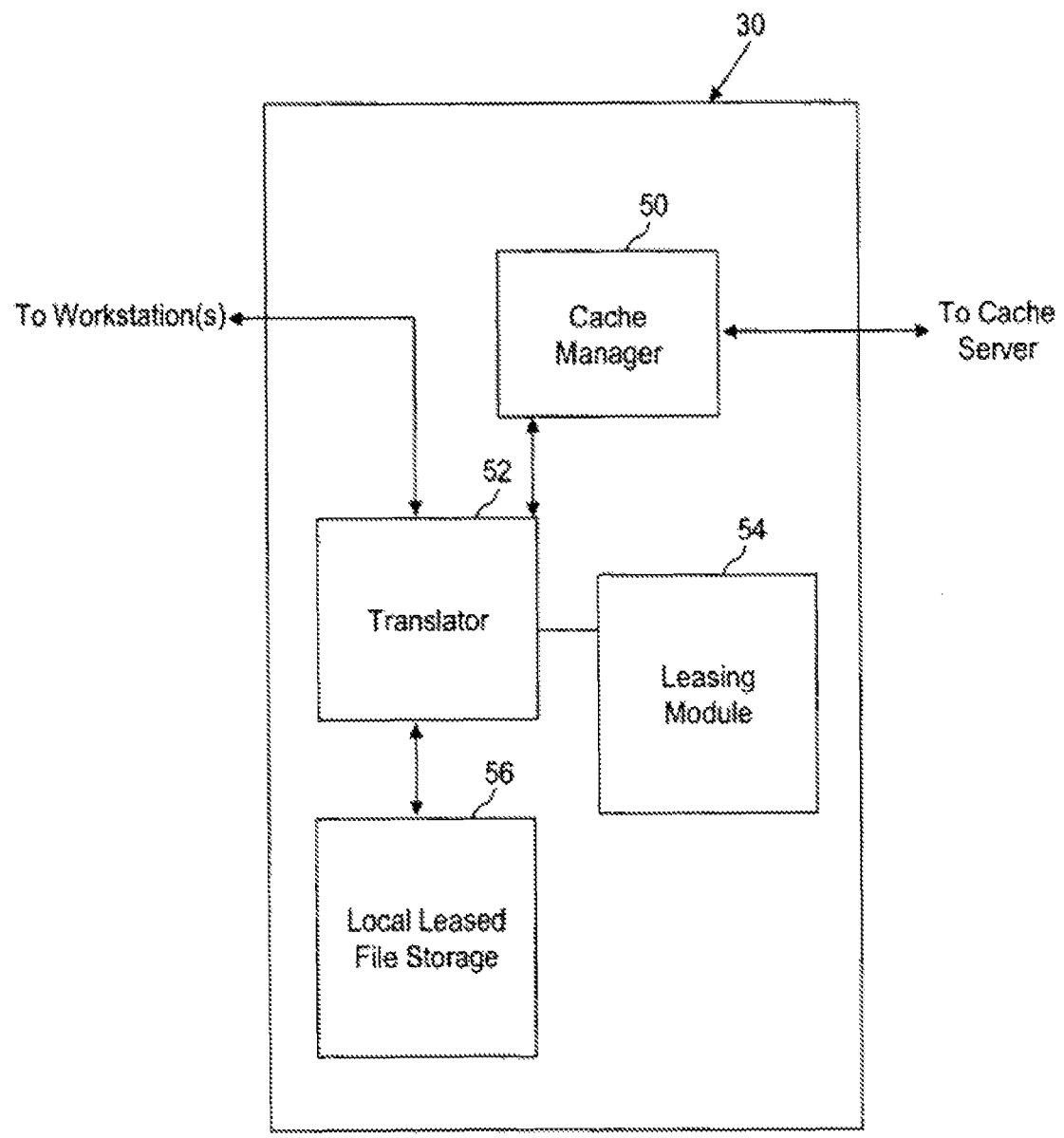
FIG. 3 is a block diagram illustrating the functional components of an EFG appliance (or server), which might be used in some embodiments of the present invention.

FIG. 3 is a block diagram of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. Typically, a storage cache is associated with every remote computer system that can access a data file stored at a file server of a data center system over the network 28.

Figure 4:
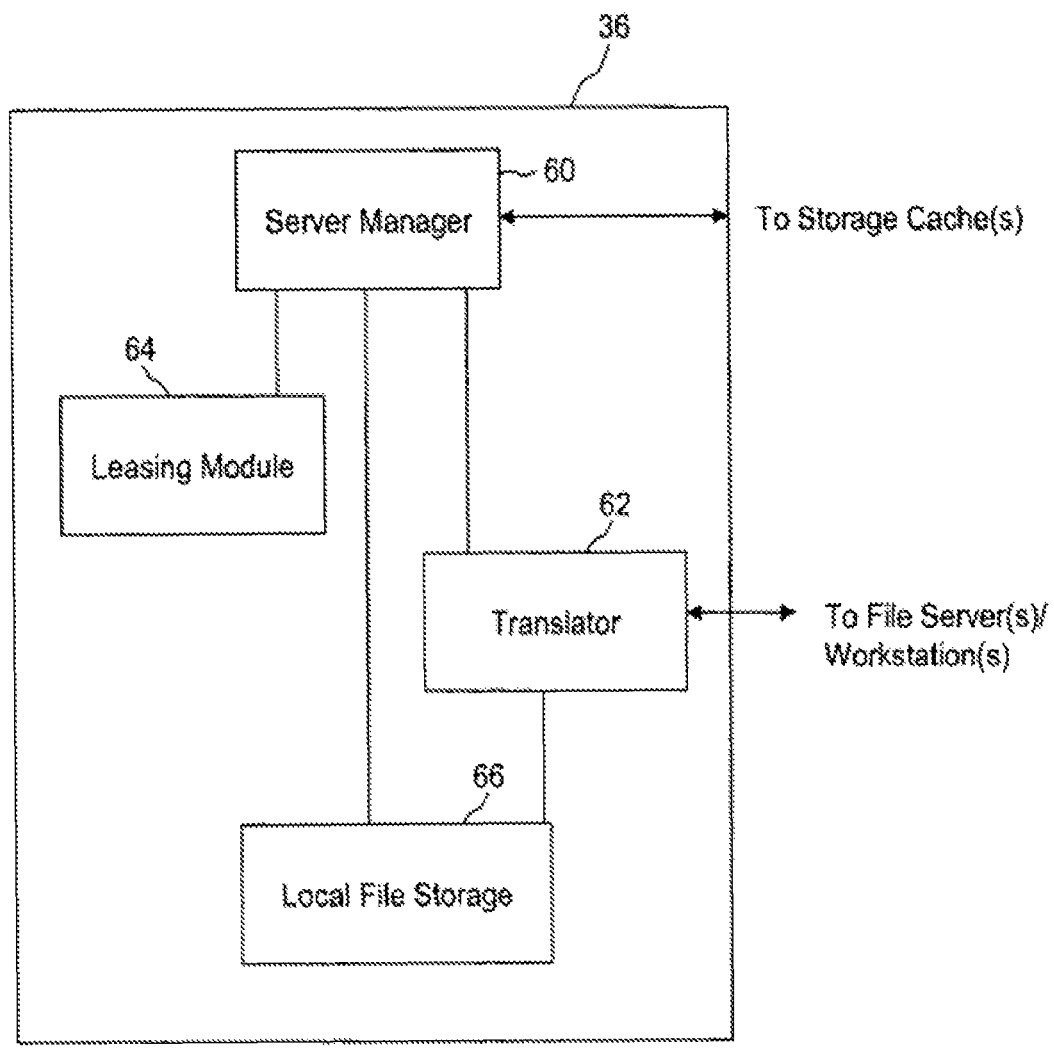
FIG. 4 is a block diagram illustrating the functional components of a CS appliance (or server)

FIG. 4 is a block diagram of the cache server (or CS appliance). The cache server manages shared access to data files stored in the file server by multiple storage caches, such as the caches 30A and 30B, and also by workstations, such as the workstations 22E and 22F of the data center 20, which are not associated with a storage cache. In some implementations, the cache server might be a thin appliance having an architecture that makes it compatible and easily integrated with a distributed file system, such as NAS and SAN (Storage Area Network), implemented at a computer system and a data center computer system.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores, at the storage 66, copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

The translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

The storage caches and the cache server, of the storage caching system, 12 provide that a data file stored in a file server of a data center, and available for distribution to authorized workstations via a distributed file system, can be accessed for read or write purposes by the workstations, that the workstations experience reduced latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

In a connected mode, file update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In some implementations, the local storage 56 of the storage cache includes only cached data files corresponding to recently accessed data files.

B. System Architecture for EFG Appliance (or Server) and CS (Remote) Appliance (or Server)

Figure 5:
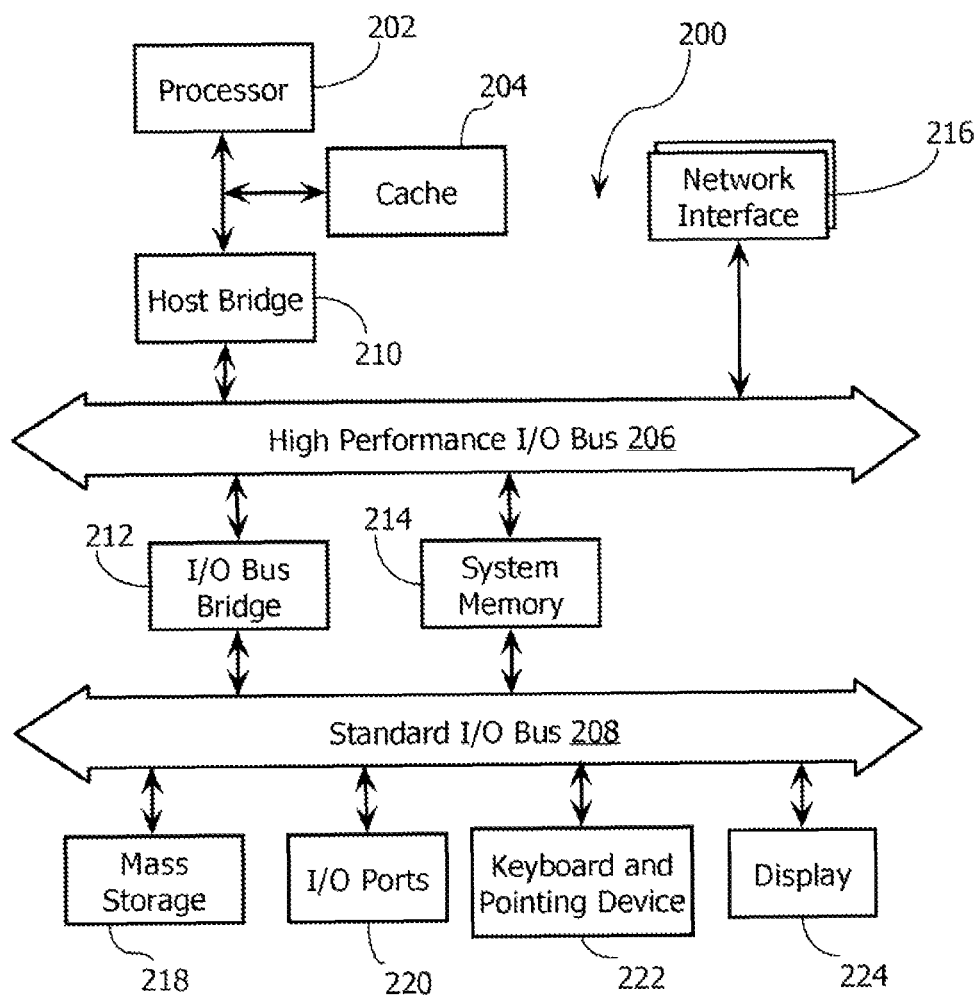
FIG. 5 is a diagram showing a high-level example system architecture that may be used to implement an EFG appliance (or server) or a CS appliance (or server)

FIG. 5 illustrates, for didactic purposes, a hardware system 200, which might be a part of an EFG appliance (or storage cache) or a remote file server appliance (or cache server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows®95/98/NT/XP/Vista operating system, available from Microsoft Corporation of Redmond, Wash., the Apple Macintosh Operating System, available from Apple Computer Inc. of Cupertino, Calif., UNIX operating systems, and the like.

Transparent CIFS Access

Typically, a client (such as workstation 22E) connected to LAN 24C can access a file or object on a remote file server 38 by specifying a pathname, such as \\FileServer\Share, where "FileServer" is the name of the server, and "Share" identifies the name of the shared folder or object. In some prior art WAFs implementations, access to this same share, hosted on file server 38 over communications network 28, when optimized using gateways 26A and 263, requires a different pathname. For example, storage cache 30A stores cached files hosted by file server 38 using a pathname convention that indicates the remote appliance (such as file server appliance 26C). For example, storage cache 30A may store cached files using the following pathname convention: \Core\FileServer\Share. Still further, as discussed above, gateway 26A includes file server functionality with which clients interact to retrieve requested files. Accordingly, remote clients (such as workstation 22A) to access a file hosted by file server 38 has to access the file using the following pathname convention: \\Edge\Core\FileServer\Share, where "Edge" identifies the EFG appliance (here, gateway 26A), and "Core" identifies the remote file server appliance (here, gateway 26C). As above, "FileServer" is the name of the server, and "Share" identifies the name of the shared folder or object. This requires users to change their client configurations to point to the edge appliance to access the storage optimized by the edge and file server appliances. This doesn't provide clients in the customer environments with transparency when using WAFS solutions. In addition, this may present other problems for mobile workstations. For example, assuming workstation 22E is a laptop. If the user connects workstation 22E to LAN 24A (as opposed to LAN 24C), the user would be required to modify the file or path names to include the "Edge" and "Core" identifiers described above. For the solution to be transparent, clients should be able to access shares on file servers as \\FileServer\Share as they would without WAFS appliances being deployed.

Figure 6:
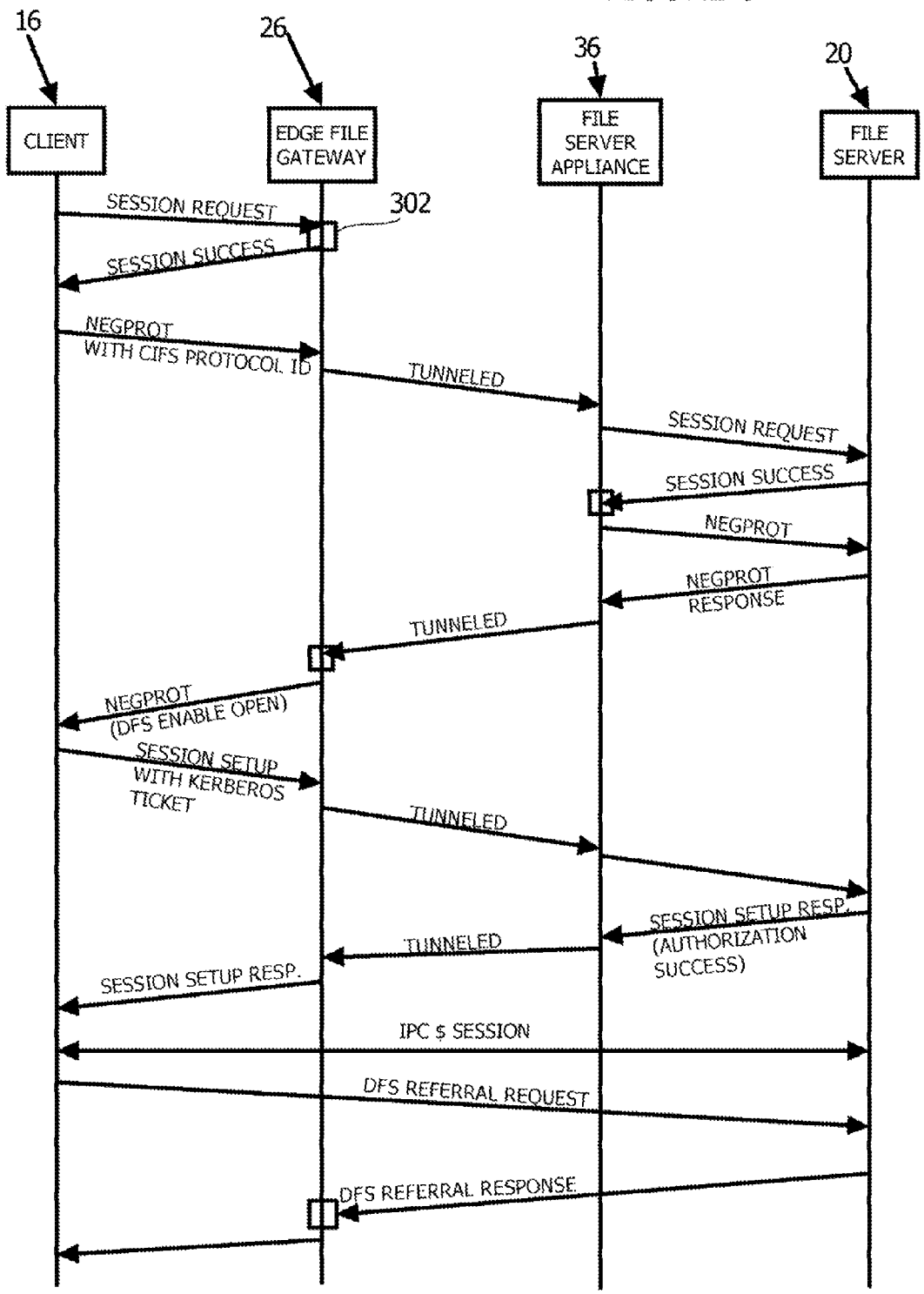
FIG. 6 is a diagram illustrating a message flow during a session negotiation between a client and a remote file server appliance, in accordance with an example embodiment.

To establish access to the share, a client and server typically execute a handshake process involving an exchange of messages to learn capabilities, to negotiate protocol options, and/or to authenticate each other. FIG. 6 illustrates an example message flow, according to one possible implementation of the invention, involving a handshake intermediated by a wide area file system including edge file gateway 26 and file server gateway 36. Referring to FIG. 6, a client, such as a CIFS client, may initiate a CIFS connection by transmitting a SESSION request. This session request can be intercepted by, or redirected to, the EFG 26. For example, in the topology illustrated in FIG. 1A, SESSION requests from the client may be redirected to the remote fileserver appliance using a Web Cache Communication Protocol ("WCCP") or Policy Based Routing ("PBR") implemented on router 22. In the topology illustrated in FIG. 1B, the EFG is in the communications path to the remote file server 20 and can intercept the SESSION request without configuration of routing policies or rules at router 22. When the SESSION request reaches the EFG, it is processed by a local CIFS redirection agent of the EEG 26. This agent handles requests from the client and helps establish the CIFS session with the remote file server.

Figure 7:
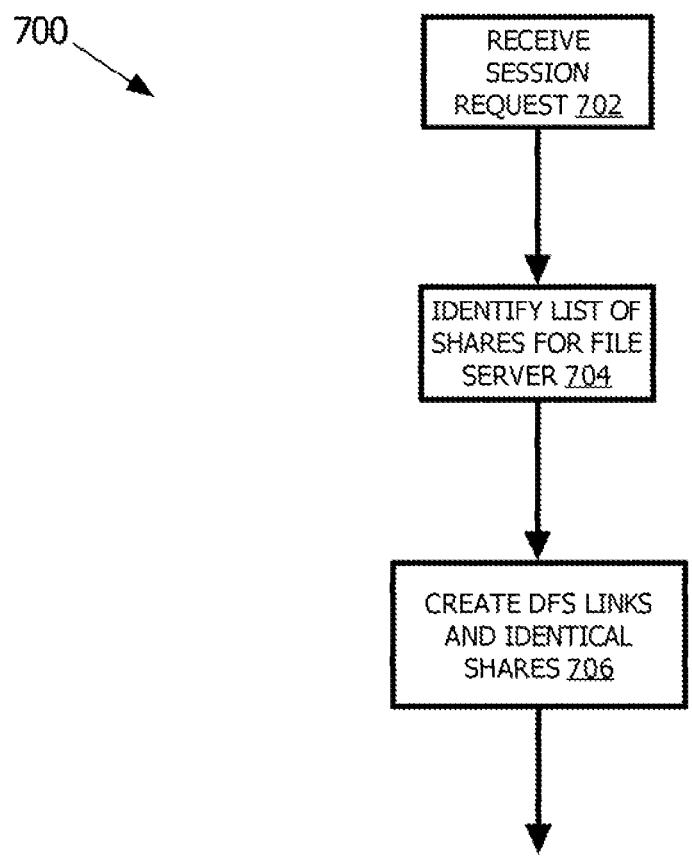
FIG. 7 is a flowchart diagram illustrating a receive session request, in accordance with an example embodiment.

As FIG. 6 illustrates, the client may initiate a CIFS connection by transmitting a SESSION request to file server 20. When the CIFS redirection agent of EFG 26 receives this request, it can create a dynamic resource for each share that can be accessed through the EFG. In one implementation, at step 302, the EEG accesses the identity of the file server 20 (such as NETBIOS name) from the session request, and looks up the identity of the remote file server appliance 36 to be used for accessing the file server 20. The EFG 26, in one implementation, may then spoof the file server 20 and transmit a SESSION success response. FIG. 7 is a flowchart diagram illustrating a method 700 implemented by EFG 26 in response to a session request, in accordance with an example embodiment. When the EFG 26 receives a session request (702), it identifies a list of shares that correspond to the file server appliance 36 and the remote file server 20 (704). Next, the EEG appliance 26 creates, if it has not done so in response to previous requests, DFS links and identical shares in its local cache with path names that identify the file server appliance 36, as discussed above (706).

Next, the client may send a NEGPROT request, including a CIFS protocol identifier, to negotiate protocol options. The EFG 26 forwards this NEGPROT request, received from the client, to file server appliance 36 or another proxy situated proximate to the remote file server. In one implementation, the NEGPROT request is tunneled to the file server appliance 36. The file server appliance 36, responsive to the NEGPROT request, recreates the CIFS SESSION request and sends it to the remote file server 20. After the proxy 36 receives the response from remote file server 20, it transmits the NEGPROT request. When the NEGPROT response is received, the file server appliance 36 tunnels it to the EFG 26, which sends the reply to client 16. In one implementation, either the file server appliance 36 or the EFG 26 inspects the NEGPROT response and modifies it, if required, to indicate a DES enablement or capability. In one particular implementation, the EEG 26 may also modify the NEGPROT response to disable signed message block (SMB) signing.

Once NEGPROT succeeds, the client may send a SESSION SETUP request. This request is also redirected to CIFS agent on the edge appliance 26. This request typically contains user credentials. The CIFS redirection agent on the EFG 26 may send the SESSION SETUP request to file server appliance 36, which sends the request to the remote file server 20. In one implementation, the CIFS redirection agent also modifies the SESSION SETUP request, if required, to indicate that SMB signing is not supported by the client. If the credentials are correct, the remote file server 20 may transmit a SESSION SETUP response indicating an authentication success. As FIG. 6 illustrates, the SESSION SETUP response is ultimately returned to the client 16 via the remote file server appliance 36 and EFG 26. In a particular implementation, the EFG 26 may modify, if required, the SESSION SETUP response to disable SMB signing. Certain clients which are capable of performing Kerberos authentication may do Kerberos authentication if they can get a Kerberos ticket for that remote file server from a key distribution center ("KDC"). Since the EFG typically does not have a shared secret key between a backend server and the KDC, it therefore will typically not be able to authenticate the client on its own. The CIFS redirection agent may then return a valid security binary object ("blob") to the client without which the client will terminate the CIFS session. In one implementation, this is accomplished, as illustrated in FIG. 6, by passing through the authentication messages directly between the client and the server.

Figure 8:
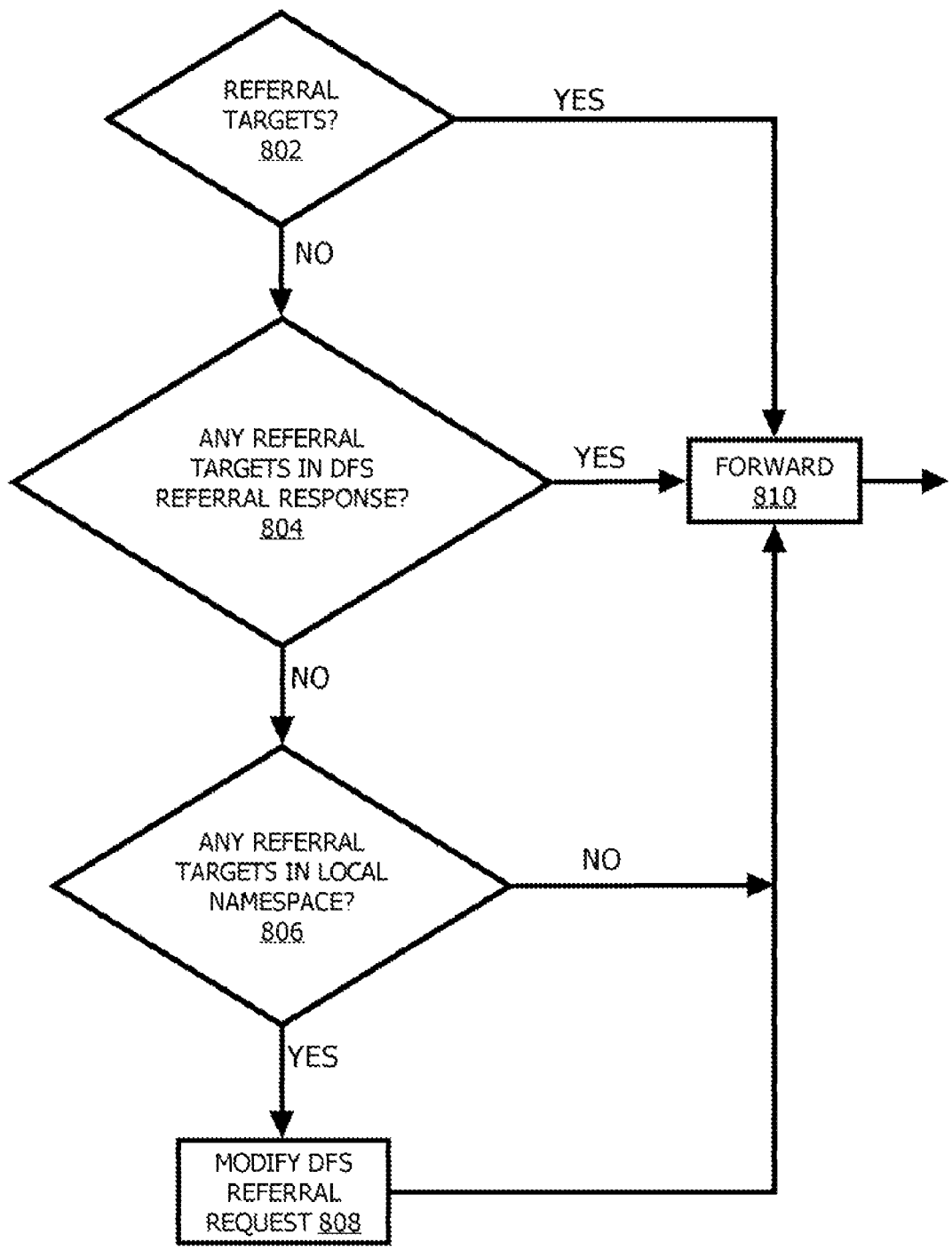
FIG. 8 is a flowchart diagram exchange of messages between a client and a remote file server appliance, in accordance with an example embodiment.

The client 16 may then attempt to connect to a share hosted on remote file server 20. In one implementation, the client 16 may use an Inter-Process Communications protocol (IPC$) to access a share. As discussed below, the EFG 26 may monitor the IPC$ session between the client 16 and remote file server 20 and potentially modify DFS referral responses to cause the client to access the EFG for the share. For example, client 16 may connect to IPC$ and transmit a DFS referral request identifying a share (e.g., \\Fileserver\Share\). As FIG. 6 illustrates, the EFG may intercept the DFS referral response transmitted by the file server 20, and conditionally modify it. FIG. 8 illustrates a process that EFG 26 may implement during intermediation of an IPC$ session. During an IPC$ session, the EFG 26 may receive a DFS referral response from remote file server 20 (802). If the DFS referral response does not include one or more referral targets (804), then the EFG 26 searches its local namespace to determine whether it has any referral targets for the requested share (in this example, \\Fileserver\Share\) (806). If so, the EFG modifies the DFS referral request to include the path name to the locally cached share (808), such as \\Edge\Core\FileServer\Share\, and forwards the modified DFS referral response to the client 16 (810). The client 16, responsive to the DFS referral response, may make a new CIFS connection directly to the EFG 26 to access a locally cached version of the share, using the path name in the DFS referral response to access resources within the share. This will typically be transparent to an end user who is trying to access the remote file server 20, since the DFS functionality of the file system client performs these mapping and connection operations automatically and/or without user intervention.

Typically, client 16 will not connect directly to a shared resource; rather, it would connect to IPC$ and issue a get_dfs_referral request. The dfs referral target, as discussed above would point to the cache maintained by EFG. In some cases, however, the EEG may see a tree connect directly to a share. In such cases, the EFG returns a successful response containing a flag indicating to the client that the share is a DFS share. Following this, the client asks for a dfs referral. If the client does not do that and issues file requests (below share level) then the EFG 26 replies with an error (error code: Path not covered), which may trigger a get_dfs_referral request from the client.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising:
   intermediating, by a gateway device, a remote file connection session between a client computing system and a file server over a network;
   maintaining by the gateway device, in a storage cache within or accessible by the gateway device, one or more shared resources of the file server;
   intercepting, by the gateway device, one or more handshake messages transmitted by the client computing system during an initiation of the remote file connection session between the client computing system and the file server;
   modifying, by the gateway device, one or more of the handshake messages transmitted by the client computing system or the file server to cause the client computing system to transmit a request for a referral link to a shared resource hosted on the file server; and
   modifying, by the gateway device, a response to the request for a referral link transmitted by the file server to identify the storage cache, the response operative to cause the client computing system to automatically connect to the storage cache to access the shared resource using a path name specified in the response to the request for a referral link;
   wherein:
      the requested shared resource of the file server is identified in the referral link received at the gateway device by a first respective path name comprising a host name and a shared resource identifier;
      the corresponding cached shared resource maintained in the storage cache is identified by a second path name comprising the first path name corresponding to the respective shared resource maintained at the file server and an identifier of the storage cache; and
      the response to the request for a referral link is automatically modified such that the path name specified in the response to the request for a referral link received by the client computing system is replaced by the second path name corresponding to the shared resource requested by the client and such that the modification of the response is transparent to an end user using the client computing system.

2. The method of claim 1 further comprising modifying one or more of the handshake messages to disable message block signing between the client computing system and the file server.

3. The method of claim 1 further comprising tunneling one or more of the handshaking messages between the gateway device and a second gateway device associated with the file server.

4. The method of claim 1 further comprising tunneling one or more authentication messages of the handshaking messages without modification between the gateway device and a second gateway device associated with the file server.

5. The method of claim 1 further comprising identifying, responsive to at least one handshake message, a second gateway device corresponding to the file server.

6. The method of claim 1 wherein one or more of the handshake messages are forwarded to the gateway device by a router configured with one or more policies.

7. The method of claim 1 wherein the gateway device is deployed in the routed communications path between the client computing system and the file server.

8. The method of claim 1 wherein the network is a wide area network.

9. An apparatus comprising:
   a memory,
   one or more network interfaces,
   one or more processors; and
   logic encoded in one or more computer readable media, the logic comprising computer executable instructions operative to cause the one or more processors to:
      intermediate a remote file connection session between a client computing system and a file server over a network;
      maintain, in a storage cache within or accessible by the apparatus, one or more shared resources of the file server;
      intercept one or more handshake messages transmitted by the client computing system during an initiation of the remote file connection session between the client computing system and the file server;
      modify one or more of the handshake messages transmitted by the client computing system or the file server to cause the client computing system to transmit a request for a referral link to a shared resource hosted on the file server; and
      modify a response to the request for a referral link transmitted by the file server to identify the storage cache, the response operative to cause the client computing system to automatically connect to the storage cache to access the shared resource using a path name specified in the response to the request for a referral link;
      wherein:
         the requested shared resource of the file server is identified in the referral link received at the gateway device by a first respective path name comprising a host name and a shared resource identifier;
         the corresponding cached shared resource maintained in the storage cache is identified by a second path name comprising the first path name corresponding to the respective shared resource maintained at the file server and an identifier of the storage cache; and
         the response to the request for a referral link is automatically modified such that the path name specified in the response to the request for a referral link received by the client computing system is replaced by the second path name corresponding to the shared resource requested by the client and such that the modification of the response is transparent to an end user using the client computing system.

10. The apparatus of claim 9 further comprising computer executable instructions operative to cause the one or more processors to modify one or more of the handshake messages to disable message block signing between the client computing system and the file server.

11. The apparatus of claim 9 further comprising computer executable instructions operative to cause the one or more processors to tunnel one or more of the handshaking messages between the apparatus and a second gateway device associated with the file server.

12. The apparatus of claim 9 further comprising computer executable instructions operative to cause the one or more processors to tunnel one or more authentication messages of the handshaking messages without modification between the apparatus and a second gateway device associated with the file server.

13. A system comprising:
a first gateway device operative to:
  maintain, in a storage cache within or accessible by the first gateway device, cached versions of one or more shared resources of a file server;
  allow access to the cached versions to one or more client computing systems; and
a second gateway device operative to:
  access the one or more shared resources of the file server; and
  transmit the one or more shared resources to the first gateway device;
wherein the first gateway device is further operative to:
  intercept one or more handshake messages transmitted by a one of the one or more client computing systems during an initiation of a remote file connection session between the one of the one or more client computing systems and the file server;
  modify one or more of the handshake messages transmitted by the one of the one or more client computing systems or the file server to cause the client computing system to transmit a request for a referral link to a shared resource hosted on the file server; and
  modify a response to the request for a referral link transmitted by the file server to identify the storage cache, the response operative to cause the one of the one or more client computing systems to automatically connect to the storage cache to access the shared resource using a path name specified in the response to the request for a referral link;
wherein:
  the requested shared resource of the file server is identified in the referral link received at the gateway device by a first respective path name comprising a host name and a shared resource identifier;
  the corresponding cached shared resource maintained in the storage cache is identified by a second path name comprising the first path name corresponding to the respective shared resource maintained at the file server and an identifier of the storage cache; and
  the response to the request for a referral link is automatically modified such that the path name specified in the response to the request for a referral link received by the client computing system is replaced by the second path name corresponding to the shared resource requested by the client and such that the modification of the response is transparent to an end user using the client computing system.

14. The method of claim 1, wherein the second path name further comprises one or more identifiers corresponding to the gateway device or one or more other gateway devices.

15. The apparatus of claim 9, wherein the second path name further comprises one or more identifiers corresponding to the gateway device or one or more other gateway devices.

16. The system of claim 13, wherein the second path name further comprises one or more identifiers corresponding to the gateway device or one or more other gateway devices.

* * * * *